Feb. 15, 1949.                J. H. BOOTH                2,461,626
                                 JOINT
                          Filed Dec. 9, 1944
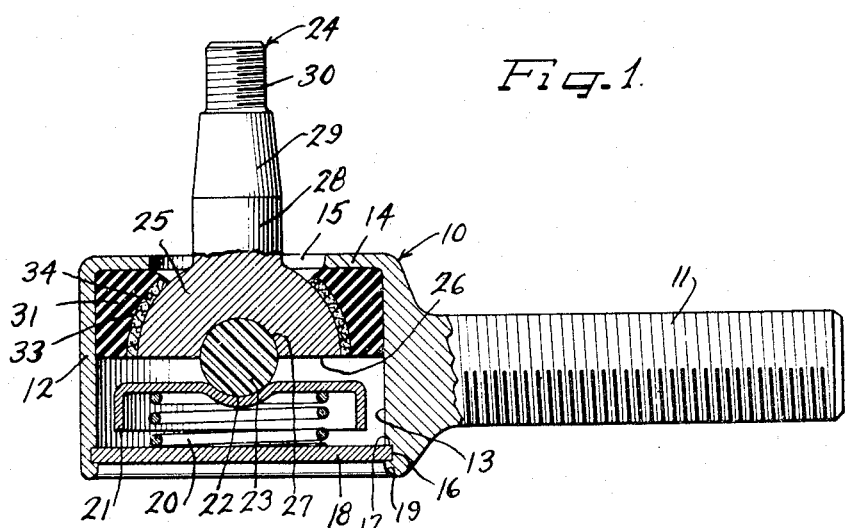
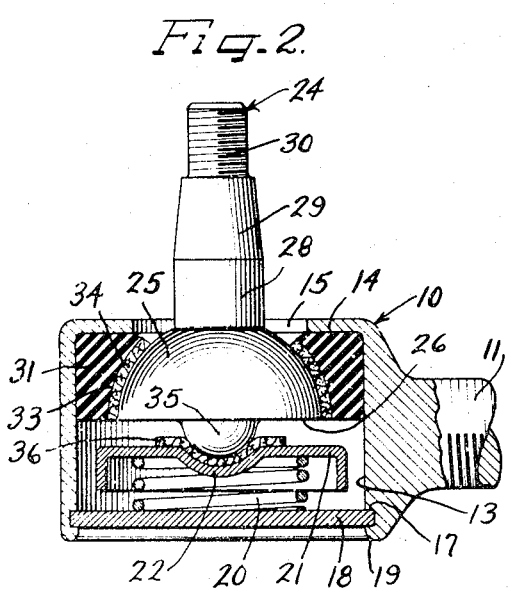
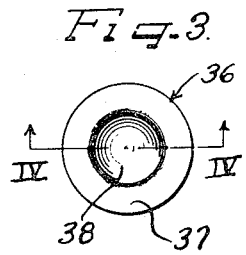
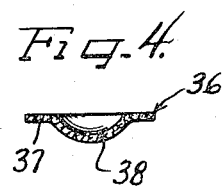
Inventor
JAMES H. BOOTH Patented Feb. 15, 1949

2,461,626

UNITED STATES PATENT OFFICE 2,461,626

JOINT

James H. Booth, Detroit, Mich., assignor to Thompson Products, Inc., Cleveland, Ohio, a corporation of Ohio Application December 9, 1944, Serial No. 567,470

5 Claims. (Cl. 287—90)

This invention relates to joint assemblies which do not require lubrication and specifically relates to tie rod joints having resiliently backed plastic material bearing surfaces cooperating with metal bearing surfaces.

The invention will be hereinafter specifically described as embodied in tie rod ends or joints for the steering assemblies of automotive vehicles, but it should be understood that the joints of this invention are generally useful in the art, especially wherever limited universal movement is required between two operating parts.

According to this invention, a tie rod socket or housing receives a rubber bushing lined with a molded synthetic resin or plastic-impregnated fabric material. The molded lining of the bushing defines a bearing surface accommodating rotating and tilting movements. A metal tie rod joint stud has the head thereof tiltably and rotatably mounted in the molded lining of the bushing. A spring-pressed retainer acts through a plastic material member to urge the head of the joint stud into proper bearing relation with the liner. In one form of the invention a molded plastic sphere is interposed between the joint stud and the spring-urged retainer. In another form of the invention, the joint stud has an integral rounded button end on the bottom thereof receiving a plastic cap member thereover and this cap member, in turn, is seated in a depression provided in the spring-urged retainer. In both forms of the invention, therefore, the metal joint stud only has bearing engagement with plastic material, and lubrication of the bearing surfaces is not necessary for efficient and smooth operation. The rubber bushing provides a somewhat yieldable seat for the stud head, and the bushing is preferably slightly larger than the inside dimensions of the housing, so that the rubber will be maintained under compressive load. These compressive loads will tend to keep the liner in snug relation with the head of the stud, although the plastic material renders the fabric of the liner somewhat rigid.

A feature of the invention resides in the fact that the tie rod joints need never be lubricated, and still they will continue to function smoothly and efficiently throughout a long wear life.

A further feature of the invention resides in the use of plastic material between all relatively movable parts of the joint, so that metal-to-metal engagement is prevented, and wear of metal surfaces is minimized even though the joints operate in a totally dry condition free from any type of lubricant.

An object of the invention resides in the provision of a plastic insert between a spring-urged retainer and a stud member of a tie rod joint to prevent contact of metal parts and to maintain quiet and efficient operation of the relatively moving parts.

Another object of the invention is to provide a joint assembly accommodating limited universal movement between two relatively operating metal parts wherein plastic material is interposed between the parts so that metal-to-metal engagement is eliminated.

A specific object of the invention is to provide a flexible tie rod joint capable of efficient operation in the total absence of lubricant.

A still further object of the invention is to provide a tie rod joint having automatic wear take-up features for maintaining plastic bearing surfaces in proper bearing engagement with relatively movable metal bearing surfaces.

Other and further objects of the invention will be apparent to those skilled in the art from the following detailed description of the annexed sheet of drawings which, by way of preferred examples only, illustrate two embodiments of the invention.

On the drawings:

Figure 1 is a side elevational view, with parts broken away and shown in vertical cross section, of one form of tie rod joint according to this invention.

Figure 2 is a fragmentary side elevational view, with parts broken away and shown in vertical cross section, of another form of tie rod joint according to this invention.

Figure 3 is a plan view of a plastic material insert between the stud and spring urged retainer of the joint of Figure 2.

Figure 4 is a transverse cross-sectional view taken along the line IV—IV of Figure 3.

As shown on the drawings:

In Figure 1 the reference numeral 10 designates a tie rod socket or housing having an externally threaded laterally projecting stem portion 11 for threaded insertion into the end of a tie rod (not shown). The socket 10 includes an enlarged end housing portion 12. This housing portion 12 has a straight cylindrical bore 13 extending from one end thereof to an end wall 14. The end wall 14 has a reduced-diameter opening 15, formed therethrough.

The cylindrical wall 13 is counterbored as at 16 to provide a shoulder 17 inwardly from the end of the housing.

A closure disk 18 is seated in the counterbore 16 against the shoulder 17 and is held thereagainst by a spun-over portion 19 of the housing.

A coil spring 20 is bottomed on the closure disk 18 and acts against a retainer member 21 disposed freely in the housing and having a fragmental spherical depression 22 in the end wall thereof.

A synthetic resin or plastic material sphere 23 is seated in the depression or dimple 22. This sphere 23 is a complete ball made of plastic and a suitable filler. Thermosetting plastic materials capable of forming relatively hard and strong molded parts are used.

A tie rod stud 24 has a fragmental spherical head 25 disposed in the housing and this head has the major diameter portion thereof terminating in a flat end wall 26 which is recessed in the central portion to provide a fragmental spherical seat 27 for the sphere 23.

A cylindrical shank portion 28 projects from the head 25 freely through the aperture 15 of the end wall 14 and merges into a tapered shank portion 29 for receiving therearound the eye end of a steering arm or the like (not shown). A reduced-diameter cylindrical threaded end 30 is provided on the shank at the small end of the tapered portion 29.

A rubber bushing 31 preferably in the form of a cylindrical block and having an outer diameter greater than the diameter of the bore 13 is seated in the housing portion 12 of the socket under somewhat of a compression load. This bushing is bottomed on the wall 14 of the housing and has a fragmental spherical shaped central aperture 33 therethrough converging from a major diameter at one end face thereof to a minor diameter at the end face that is bottomed on the housing wall 14.

This aperture 33 of the bushing 31 is lined with a synthetic resin or plastic material-impregnated canvas liner 34. The liner 34 is bonded to the rubber bushing as by vulcanization or the like. The plastic material impregnated into the canvas is in a molded condition and is relatively rigid to provide a good wearing bearing surface for the stud head 25.

Examples of suitable resin material for impregnating the canvas liner, and for forming the sphere 23 are known in the trade as "Insurox C. G.," "Baltic," and the like. Any moldable condensation product capable of forming a good wear-resisting bearing surface is operative.

The bushing 31 is preferably composed of rubber, but any resilient material could be used, including synthetic rubber, resilient plastics, and the like materials.

The resiliently backed liner 34 provides a somewhat flexible seat for the stud and, while this seat is somewhat rigid, the compressive loading of the resilient material in the housing maintains the liner in good snug bearing engagement with the stud head.

The stud head 25 is of larger diameter than the opening 15 so that the stud cannot drop out of the housing even though the seat for the stud head disintegrates.

The spring-urged retainer 21 constantly urges the stud head toward the small end of the bushing aperture, or in the direction of convergence of the bearing surfaces, to maintain the bearing surfaces in constant bearing engagement.

The head 25 of the stud can tilt and rotate on the bearing surface of the liner 34 while the sphere 23 can tilt and rotate in the depression 22 of the retainer 21. The spring 20 also retains the sphere in its seats 27 and 22.

In the form of the invention shown in Figure 2, parts identical with parts described in Figure 1 have been marked with the same reference numerals.

As shown in Figure 2, instead of providing a semi-spherical recess in the end face 26 of the stud head 25, an integral semi-ball button end 35 is provided on the stud head to project from the central portion of the end face 26 into a molded plastic material insert 36 which is seated on the retainer 21.

As best shown in Figures 3 and 4, the plastic insert piece 36 has a flat rim 37 and a depressed semi-spherical central portion 38 providing a socket for the button end 35. This portion 38 seats in the dimple or depression 22 of the retainer 21, while the flat rim 37 seats on the flat end face of the retainer.

In operation of the joint assembly shown in Figure 2, the button end 35 rotates and tilts in the insert member 36. The insert member 36 therefore takes the place of the sphere 23.

The insert member 36 is preferably composed of synthetic resin or plastic material impregnated canvas molded into shape and, in this respect, is similar to the liner 34.

From the above descriptions it will be understood that the invention provides a flexible tie rod joint composed of a headed stud surrounded by bearing material composed of resin-impregnated or plastic material-impregnated fabric. This fabric is backed by a resilient composition bushing such as natural or synthetic rubber. The bushing is seated in a housing under compressive load, being slightly larger than the inside dimensions of the housing. A spring-urged retainer acts on the joint stud through a plastic material insert.

The studs of the joints of this invention tilt and rotate on plastic bearing surfaces which need not be lubricated.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A joint comprising a housing having a reduced opening in one end and an enlarged opening in the opposite end, a wall in said housing adjacent said end with the reduced opening therein and providing a thrust surface, a resilient bushing in said housing thrusting against said surface, said bushing having a synthetic resin-impregnated liner bonded thereto and defining a fragmental spherical ball seat having a small open end registering with the reduced opening in the end of said housing and a large open opposed end, a stud having a fragmental spherical head seated in said liner together with a shank portion projecting freely from the small open end of the liner through the reduced opening of the housing, a spring-urged retainer in said housing, and a plastic material insert between said stud head and said spring-urged retainer transmitting thrusting forces of the retainer to the stud head for maintaining the stud head in good bearing relation with the liner.

2. A tie rod end comprising a socket member having a stem portion for attachment to a tie rod and an end portion defining an open-ended housing, a rubber bushing in said housing, a molded plastic-impregnated fabric material liner in said bushing defining a segmental spherical seat, a stud having a segmental spherical head seated on said seat in tiltable and rotatable relation therewith together with a shank projecting from said head through said bushing and housing, a closure plug for the open end of the housing remote from said shank of the stud, a spring bottomed on said closure plug, a retainer acted on by said spring, and a plastic material insert between said retainer and said head of the stud accommodating relative rotating movements between the stud head and retainer while transferring thrusting forces of the spring to the stud for maintaining the stud head in good bearing relation with the seat.

3. A flexible tie rod end comprising a tie rod socket, a tie rod stud having a shank projecting into said socket together with a fragmental ball head disposed in the socket, a synthetic resin-impregnated canvas material seat surrounding the fragmental ball head of the stud, a resilient bushing in said socket backing said canvas material and bonded thereto, a spring-urged retainer in said socket, and a molded plastic part between said retainer and said fragmental ball head of the stud transmitting the action of the spring to the fragmental ball head for maintaining the head in good bearing relation with the canvas seat.

4. A tie rod joint comprising a socket having a resiliently backed plastic material bearing wall accommodating tilting and rotating movements, a stud having a head seated on said bearing wall, a spring-urged retainer in said socket having a rounded dimple therein, and a plastic material bearing member seated in said dimple and acting against said stud to transmit forces of the spring to the stud for maintaining the stud head in good bearing relation with the seat.

5. A joint comprising a stud having a half-ball end with a rounded button projection thereon, a seat for said half-ball end, a non-metallic cap for said rounded projection, a retainer having a depression receiving said cap, and a spring acting on said retainer to urge the stud head into good bearing relation with said seat.

JAMES H. BOOTH.

REFERENCES CITED

The following references are of record in the file of this patent:

UNITED STATES PATENTS

| Number | Name | Date |
| --- | --- | --- |
| 2,048,803 | Marles | July 28, 1936 |
| 2,049,163 | Hufferd | July 28, 1936 |
| 2,128,087 | Gatke | Aug. 23, 1938 |
| 2,178,206 | Katcher | Oct. 31, 1929 |
| 2,197,889 | Katcher | Apr. 23, 1940 |
| 2,274,418 | Katcher | Feb. 24, 1942 |
| 2,274,420 | Katcher | Feb. 24, 1942 |
| 2,317,920 | Landt et al. | Apr. 27, 1943 |
| 2,350,398 | Hufferd | June 6, 1944 |
| 2,398,848 | Newey | Apr. 23, 1946 |